United States Patent
Lin et al.

(10) Patent No.: US 8,526,302 B2
(45) Date of Patent: *Sep. 3, 2013

(54) MOTHERBOARD WITH BACKUP NETWORK CIRCUIT

(75) Inventors: Hou-Yuan Lin, Taipei-Hsien (TW);
Chen-Shun Chen, Taipei Hsien (TW);
Tse-Hsine Liao, Taipei Hsien (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 747 days.

This patent is subject to a terminal disclaimer.

(21) Appl. No.: 12/413,519

(22) Filed: Mar. 28, 2009

(65) Prior Publication Data

US 2010/0246383 A1    Sep. 30, 2010

(51) Int. Cl.
*G06F 11/20* (2006.01)

(52) U.S. Cl.
USPC ........... 370/228; 370/220; 370/221; 370/242; 714/4.11

(58) Field of Classification Search
USPC ................ 370/217, 218, 221, 225, 227, 228, 370/242–244; 714/2–5
See application file for complete search history.

(56) References Cited

U.S. PATENT DOCUMENTS

| 5,649,089 A * | 7/1997 | Kilner .............................. 714/6 |
| 6,381,218 B1 * | 4/2002 | McIntyre et al. ............. 370/245 |
| 2004/0008722 A1 * | 1/2004 | Ellis et al. ..................... 370/461 |

* cited by examiner

*Primary Examiner* — Hoon J Chung
(74) *Attorney, Agent, or Firm* — Chun-Ming Shih

(57) ABSTRACT

A motherboard includes at least one backup network circuit except for a network circuit used in a normal setup. The motherboard includes a first network circuit, a second network circuit, a network port, a switch circuit and a driver. The switch circuit is configured for coupling the first network circuit or the second network circuit to the network port. The driver is configured for switching the switch circuit according to states of the network port and the first network circuit.

10 Claims, 2 Drawing Sheets

MOTHERBOARD WITH BACKUP NETWORK CIRCUIT

BACKGROUND

1. Field of the Invention

The present invention relates to a motherboard, and more particularly to a motherboard with at least one backup network circuit.

2. Description of the Related Art

A motherboard is generally combined with a network circuit by an onboard mode or an insertion mode to provide a network interface.

However, the network circuit often meets large voltages or large currents and is easy to be damaged. If the network circuit or the motherboard is frequently repaired, it will consume more resources of manufacturers and be inconvenient for customers.

BRIEF SUMMARY

The present invention relates to a motherboard, which further comprises at least one backup network circuit except for a network circuit used in a normal setup.

A motherboard, in accordance with an exemplary embodiment of the present invention, comprises a first network circuit, a second network circuit, a network port, a switch circuit and a driver. The switch circuit is configured for coupling the first network circuit or the second network circuit to the network port. The driver is configured for switching the switch circuit according to states of the network port and the first network circuit.

The switch circuit may couple the first network circuit to the network port in a normal setup. When the network port is connected to a network system and the first network circuit is unable to connect to the network system, the driver switches the switch circuit to be in a backup setup from the normal setup, which couples the second network circuit to the network port for performing a network communication function.

For better understanding these and other objects, features and advantages of the present invention, the following will enumerate a plurality of exemplary embodiments cooperating with figures to describe the present invention in detail.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present motherboard, in detail. The following description is given by way of example, and not limitation.

Figure 1:
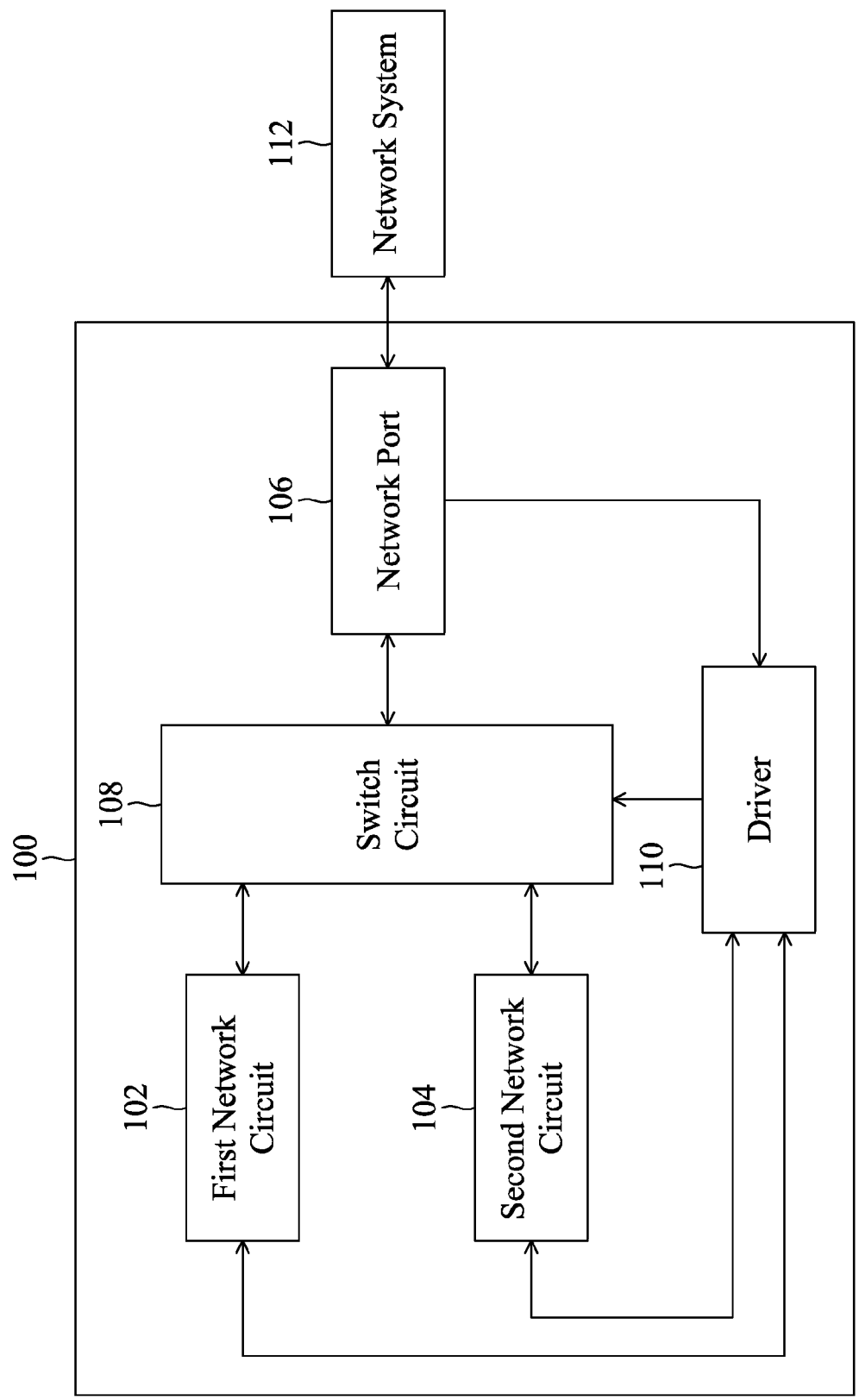
FIG. 1 is a block diagram of a motherboard in accordance with an exemplary embodiment of the present invention.

FIG. 1 illustrates a motherboard in accordance with an exemplary embodiment of the present invention. The motherboard 100 includes a first network circuit 102, a second network circuit 104, a network port 106, a switch circuit 108 and a driver 110. The switch circuit 108 is switched by the driver 110 for coupling the first network circuit 102 or the second network circuit 104 to the network port 106.

In a normal setup, the switch circuit 108 couples the first network circuit 102 to the network port 106. In the normal setup, the first network circuit 102 is configured for performing the network communication function of the motherboard 100.

The driver 110 determines whether to switch the switch circuit 108 according to the states of the network port 106 and the first network circuit 102. For example, if the network port 106 is connected to a network system 112 and the first network circuit 102 is normally communicated with the network system 112, the driver 110 determines that the network communication function of the motherboard 100 is in a normal state and keeps the switch circuit 108 in the normal setup. If the network port 106 is connected to the network system 112 and the first network circuit 102 is unable to connect to the network system 112, the driver 110 determines that the network communication function thereof is in a wrong state and switches the switch circuit 108 to be in a backup setup from the normal setup. In the backup setup, the switch circuit 108 employs the second network circuit 104 instead of the first network circuit 102 to be coupled to the network port 106. The second network circuit 104 instead of the first network circuit 102 performs the network communication function of the motherboard 100.

In addition, the driver 110 may further be communicated with the second network circuit 104. In some exemplary embodiments, the driver 110 further detects the state of the second network circuit 104 after the switch circuit 108 is switched to be in the backup setup, to determine the reason of the network communication function in the wrong state. If the second network circuit 104 is also unable to connect to the network system 112, it may be wrong with the network system 112 and the first network circuit 102 is not damaged. At the moment, the driver 110 switches the switch circuit 108 to return the normal setup and the motherboard 100 also employs the first network circuit 102 to perform the network communication function. On the contrary, if the network communication function returns to normal after the switch circuit 108 is switched to be in the backup setup, it represents the first network circuit 102 is really damaged. At the moment, the driver 110 makes the switch circuit 108 always operate in the backup setup thereafter such that the second network circuit 104 substitutes the first network circuit 102 to perform the network communication function of the motherboard 100.

The present invention does not limit that the motherboard thereof only has two network circuits. In other exemplary embodiments, the motherboard of the present invention may further include more than one backup network circuits. Once the original-used network circuit is damaged, one of the backup network circuits can be selected to substitute the damaged network circuit.

Figure 2:
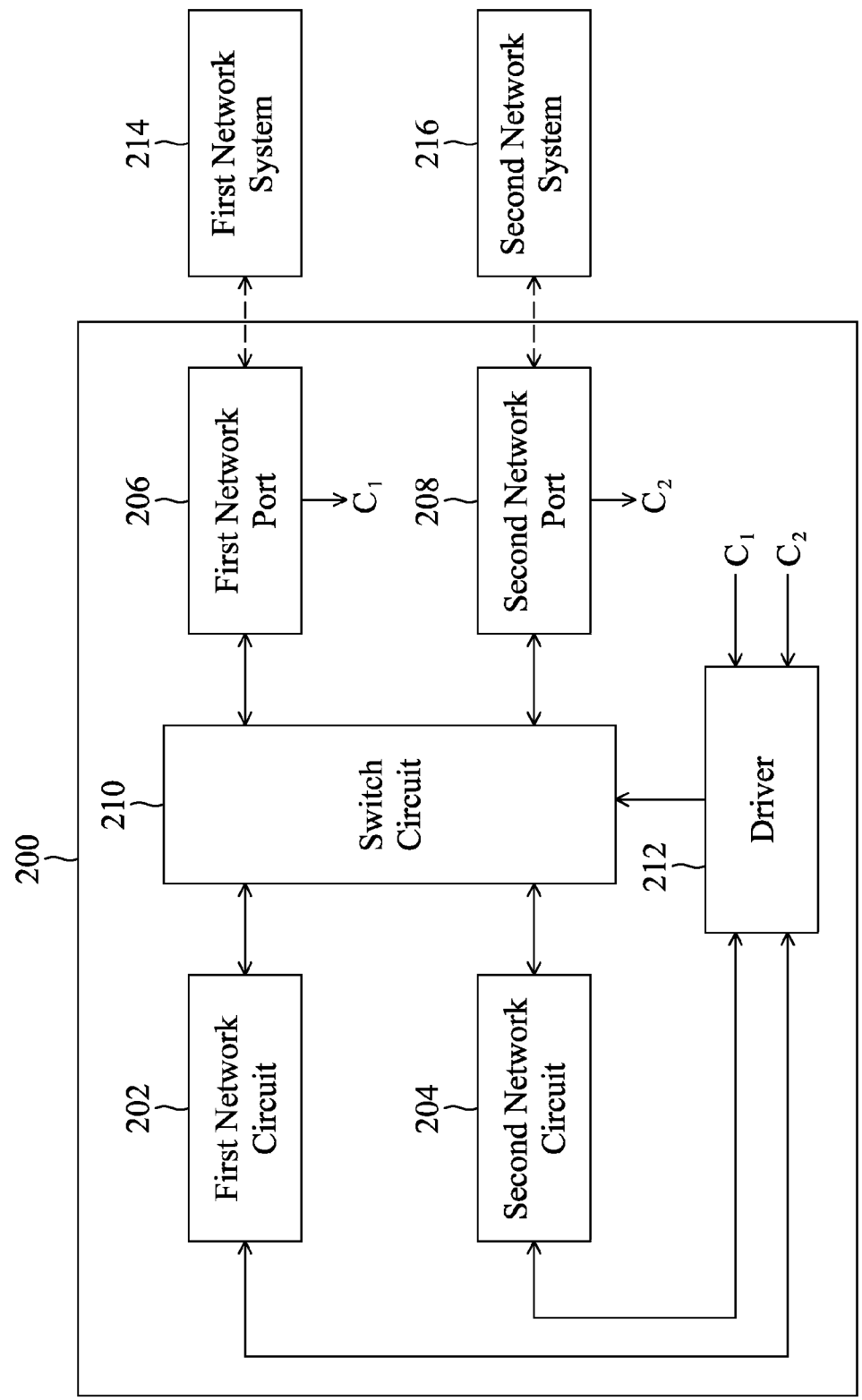
FIG. 2 is a block diagram of a motherboard in accordance with another exemplary embodiment of the present invention.

FIG. 2 illustrates a motherboard in accordance with another exemplary embodiment of the present invention. The motherboard 200 includes a first network circuit 202, a second network circuit 204, a first network port 206, a second network port 208, a switch circuit 210 and a driver 212. The switch circuit 210 is controlled by the driver 212 to take charge of the conditions of the first and second network circuits 202, 204 coupled to the first and second network ports 206, 208.

In a normal setup, the switch circuit 210 makes the first and second network circuits 202, 204 be coupled to the first and second network ports 206, 208, respectively. A double network frame is formed in the normal setup, and the motherboard 200 can be coupled to two network systems (a first network system 214 and a second network system 216 as shown in FIG. 2).

The first and second network ports 206 and 208 may employ signals C1 and C2 to indicate whether they are coupled to the network systems. The driver 212 can receive the signals C1 and C2 to ascertain the connection states of the first and second network ports 206, 208 coupled to the network systems.

The switch circuit 210 may have a first backup setup. The following will describe the operation thereof in detail. When the switch circuit 210 is in the normal setup, the first network port 206 is coupled to a network system (such as the first network system 214) and the second network port 208 is not coupled to any network system, if the first network circuit 202 is not normally communicated with the first network system 214, the driver 212 switches the switch circuit 210 to be in the first backup setup. In the first backup setup, the first network circuit 202 is not connected with the first network port 206, and the second network circuit 204 is coupled to the first network port 206 such that the second network circuit 204 is communicated with the first network system 214.

In some exemplary embodiments, the driver 212 further detects the state of the second network circuit 204 after the switch circuit 210 is switched to be in the first backup setup from the normal setup, to determine the reason of the network communication function in the wrong state. If the second network circuit 204 is also unable to connect to the first network system 214, it may be wrong with the first network system 214 and the first network circuit 202 is not damaged. At the moment, the driver 212 switches the switch circuit 210 to return the normal setup. That is, the first and second network circuits 202, 204 are coupled to the first and second network ports 206, 208, respectively. On the contrary, if the network communication function returns to the normal state after the switch circuit 210 is switched to be in the first backup setup from the normal setup, it represents the first network circuit 202 is really damaged. The driver 212 can disable the first network circuit 202 and make the switch circuit 210 always employ the second network circuit 204 to perform the network communication function of the motherboard 200 thereafter.

In addition, the switch circuit 210 may further have a second backup setup. The following will describe the operation thereof in detail. When the switch circuit 210 is in the normal setup, the first network port 206 is not coupled to any network system and the second network port 208 is coupled to a network system (such as the second network system 216 as shown in FIG. 2), if the second network circuit 204 is not normally communicated with the second network system 216, the driver 212 switches the switch circuit 210 to be in the second backup setup. In the second backup setup, the second network circuit 204 is not connected with the second network port 208, and the first network circuit 202 is coupled to the second network port 208 such that the first network circuit 202 is communicated with the second network system 216.

In some exemplary embodiments, the driver 212 further detects the state of the first network circuit 202 after the switch circuit 210 is switched to be in the second backup setup from the normal setup, to determine the reason of the network communication function in the wrong state. If the first network circuit 202 is also unable to connect to the second network system 216, it may be wrong with the second network system 216 and the second network circuit 204 is not damaged. At the moment, the driver 212 switches the switch circuit 210 to return the normal setup. That is, the first and second network circuit 202, 204 are coupled to the first and the second network ports 206, 208, respectively. On the contrary, if the network communication function returns to normal after the switch circuit 210 is switched to be in the second backup setup from the normal setup, it represents the second network circuit 204 is really damaged. The driver 212 can disable the second network circuit 204 and make the switch circuit 210 always employ the first network circuit 202 to perform the network communication function of the motherboard 200 thereafter.

The exemplary embodiment as shown in FIG. 2 is not used to limit that the present invention includes two groups of the network circuits and the network ports. In some exemplary embodiments, the motherboard of the present invention may further includes more than two groups thereof to form a multiple network frame for performing the backup technology of the present invention. The driver will switch the switch circuit according to the operation state of the network, to change the connection between the network circuits and the network ports. The damaged network circuit will be substituted by one of other idle network circuits.

All of the network circuits of the present invention are not limited to be onboard on the motherboard. The network circuits may be combined with the motherboard by other modes (such as an insertion mode, etc.) to perform the network circuits of the present invention. For example, all of the network circuits of the motherboard of the present invention may be combined with the motherboard by the onboard mode, or the insertion mode. Alternatively, some of the network circuits may be combined with the motherboard by the onboard mode and the other thereof may be combined with the motherboard by the insertion mode.

The network communication technology of the present invention is not limited to be the wire technology. Other technologies (such as Bluetooth, wireless, etc.) can be used in the motherboard of the present invention. For example, if employing the wireless communication technology, the network ports may be performed by antennas.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A motherboard of a computer, comprising:
a first network circuit;
a second network circuit, wherein each of the first network circuit and the second network circuit is an onboard mode circuit or an insertion mode circuit, and there is no direct connection between the first network circuit and the second network circuit;
a first network port;
a switch circuit configured for coupling one of the first network circuit and the second network circuit to the first network port;
an individual driver directly connected to the switch circuit, configured for controlling the switch circuit according to states of the first network port and the first network circuit, configured for detecting the second network circuit after the switch circuit is switched to be in a backup setup, configured for switching the switch circuit to return to a normal setup when the second network circuit is unable to connect to a network system, and configured for keeping the switch circuit in the backup setup when the second network circuit is able to connect to the network system.

2. The motherboard as claimed in claim 1, wherein the switch circuit has the normal setup which couples the first network circuit to the first network port.

3. The motherboard as claimed in claim 2, wherein the driver switches the switch circuit to be in the backup setup from the normal setup when the first network port is connected to the network system and the first network circuit is unable to connect to the network system, the switch circuit being controlled to have the second network circuit couple the first network port in the backup setup.

4. The motherboard as claimed in claim 1, further comprising a second network port, wherein the switch circuit is further configured for coupling one of the first network circuit and second network circuit to the second network port.

5. The motherboard as claimed in claim 4, wherein the switch circuit has a normal setup, which couples the first network circuit to the first network port and couples the second network circuit to the second network port.

6. The motherboard as claimed in claim 5, wherein the driver switches the switch circuit to be in a first backup setup from the normal setup when the first network port is connected to a first network system, the second network port is not connected to any network system and the first network circuit is unable to connect to the first network system, and the switch circuit is controlled to have the second network circuit couple the first network port in the first backup setup.

7. The motherboard as claimed in claim 6, wherein the driver further detects the second network circuit after the switch circuit is switched to be in the first backup setup, switches the switch circuit to return to the normal setup when the second network circuit is unable to connect to the first network system, and keeps the switch circuit in the first backup setup when the second network circuit is able to connect to the first network system.

8. The motherboard as claimed in claim 6, wherein the driver further controls the switch circuit according to a state of the second network port.

9. The motherboard as claimed in claim 1, wherein the driver switches the switch circuit to be in a second backup setup from the normal setup when the first network port is not connected to any network system, a second network port is connected to a second network system and the second network circuit is unable to connect to the second network system, and the switch circuit is controlled to have the first network circuit couple the second network port in the second backup setup.

10. The motherboard as claimed in claim 9, wherein the driver further detects the first network circuit after the switch circuit is switched to be in the second backup setup, switches the switch circuit to return to the normal setup when the first network circuit is unable to connect to the second network system, and keeps the switch circuit in the second backup setup when the first network circuit is able to connect to the second network system.

\* \* \* \* \*